United States Patent
Lee

[19]

[11] Patent Number: 5,986,709
[45] Date of Patent: Nov. 16, 1999

[54] ADAPTIVE LOSSY IDCT FOR MULTITASKING ENVIRONMENT

[75] Inventor: Yoon Yung Lee, San Jose, Calif.

[73] Assignee: Samsung Electronics Co., Ltd., Seoul, Rep. of Korea

[21] Appl. No.: 08/751,493

[22] Filed: Nov. 18, 1996

[51] Int. Cl.⁶ ..................................................... H04N 7/30
[52] U.S. Cl. ........................ 348/403; 348/384; 348/390; 348/395; 382/248; 364/725.03
[58] Field of Search ..................... 348/384, 390, 348/387, 388, 399, 403–404, 408, 420, 395; 382/238, 250, 232, 305, 248; 364/725.01, 725.03, 726.01, 726.02, 726.03; 375/240; H04N 7/30

[56] References Cited

U.S. PATENT DOCUMENTS

| | | | |
|---|---|---|---|
| 5,353,060 | 10/1994 | Kessen et al. | 348/408 |
| 5,355,167 | 10/1994 | Juri | 348/405 |
| 5,361,220 | 11/1994 | Asano | 364/725.03 |
| 5,579,052 | 11/1996 | Artieri | 348/416 |
| 5,600,837 | 2/1997 | Artieri | 364/228.2 |
| 5,621,466 | 4/1997 | Miyane et al. | 348/405 |
| 5,629,736 | 5/1997 | Haskell et al. | 348/387 |
| 5,687,095 | 11/1997 | Haskell et al. | 348/387 |
| 5,737,019 | 4/1998 | Kim | 348/408 |
| 5,737,021 | 4/1998 | Chun | 348/408 |
| 5,768,433 | 6/1998 | Bolton | 382/238 |
| 5,768,445 | 6/1998 | Troeller et al. | 382/305 |
| 5,822,003 | 10/1998 | Girod et al. | 348/408 |
| 5,832,135 | 11/1998 | Merhav et al. | 382/260 |

*Primary Examiner*—Vu Le
*Attorney, Agent, or Firm*—Skjerven, Morrill, MacPherson, Franklin & Friel LLP; David T. Millers

[57] ABSTRACT

A process that alleviates processor overloading, adaptively according to the current total processor load, by gracefully degrading video output quality, so that more jobs can be run simultaneously in a multitasking operating system environment is provided. The process reduces computation for video data decompression by substituting zero values for elements of one or more bottom rows of the matrix that is multiplied to a kernel matrix in the two-dimensional inverse discrete cosine transform. In one embodiment, a process is incorporated into an MPEG firmware as a part of library modules built into a multimedia signal processor integrated circuit, which runs a real-time multitasking operating system. If running an additional video decompression task will overload the processor, the operating system rejects running the task. When the additional video compression task is rejected, a degraded version, which will not overload the processor, of the original decompression task is submitted to the operating system.

17 Claims, 4 Drawing Sheets

ADAPTIVE LOSSY IDCT FOR MULTITASKING ENVIRONMENT

BACKGROUND OF THE INVENTION

1. Field of the Invention

This invention relates to integrated circuit devices, and, in particular, to ways integrated circuit devices manipulate image data.

2. Description of Related Art

The advent of powerful VLSI chips made it possible for multiple tasks to be performed on a single chip. Multimedia signal processor (MSP) chips are examples of such powerful VLSI chips, and are often equipped with multitasking operating systems which are capable of running multiple digital signal processing (DSP) tasks virtually simultaneously, such as video and audio compression/decompression processing, modem operations, and facsimile operations. A typical multimedia computer system configuration 110 is shown in FIG. 1. The multitasking operating system provides convenience, improves productivity, and also achieves better utilization of an MSP. But running several computationally demanding DSP tasks, can overload the MSP. Video compression and decompression are two of such computationally demanding tasks that are frequently performed on an MSP.

Typical digital video images require vast amount of storage or channel bandwidth. Motion Picture Expert Group (MPEG) is an international committee charged with providing a standard for achieving compatibility between image compression and decompression equipment. Since its inception, two standards (referred hereinbelow as "MPEG-1" and "MPEG-2") have been proposed by MPEG. Each of these standards specifies both the coded digital representation of video signal for the storage media, and the process for decoding. Using MPEG-1 or MPEG-2 encoding on image data saves storage space for video data, that is, the encoding achieves data compression. Yet, MPEG-1 and MPEG-2 compression are computationally intensive due to several steps involved, one of which is a two-dimensional discrete cosine transform (2-D DCT), which performs multiple matrix multiplications. A video file encoded (i.e., compressed) and saved on a storage device has to be decoded (i.e., decompressed) before actual usage. (From now on, terms "encoding" and "compression" will be used interchangeably, and so will terms "decoding" and "decompression".) Decompression is also a computationally intensive process, as it involves reversing the steps of the 2-D DCT, called 2-D IDCT (inverse discrete cosine transform), or merely IDCT.

As a result of the heavy computational demand of a 2-D IDCT, when one or more decompression tasks (each of which perform IDCT) are involved, the number of tasks that can be reasonably run on a single processor becomes relatively small, diminishing the advantage of the multitasking operating system.

For example, each decompression task may take up 38% of the MSP's computational capacity. If, in an operating system, a third decompression task is submitted when two decompression tasks are already being carried out by the MSP, operating systems, the will reject running the third task, since running it will overload the MSP.

One of the previous approaches to deal with the overloading problem with respect to video data manipulation is to reduce the frame rate of the video output. This approach, however, produces a noticeably degraded video output which is perceptually very awkward.

What is needed is a cost-effective approach that will allow relatively more tasks to be run on a processor.

SUMMARY OF THE INVENTION

The present invention provides a computationally reduced IDCT model for adaptively dealing with processor overloading due to decompression tasks, by gracefully degrading the quality of resulting video output.

IDCT, a step performed in MPEG-1 or MPEG-2 decoding (i.e., decompression), requires multiplication of three n×n matrices, C, E and $C^t$, to compute $CEC^t$, where matrix $C^t$ is a transpose of kernel matrix C, and E is a DCT-transformed data matrix. In fact, the M multiplication is carried out in a form, $C[CE^t]^t$, which is equivalent to $CEC^t$. The computation of $C[CE^t]^t$ is carried out by computing $CE^t$ and then $CX^t$ where X is the intermediate result $CE^t$, thus performing two matrix multiplications of form CZ, where matrix Z is $E^t$ in the first multiplication and $X^t$ in the second multiplication. The present invention reduces computation by replacing the elements of bottom j rows of matrix Z with zeros (0's), where j is an integer ranging from 1 to (n−1). The effect of twice "zeroing" the bottom is that the elements of the resulting matrix are all zeros except in its upper left corner region. As these "zeroed" elements of the Z matrix usually represent high frequency components of a video frame, which convey less visual information than the low frequency components, substituting zeroes for the elements of the several bottom rows and rightmost columns does not severely degrade the video output quality. Since the frame rate is not compromised, the motion still looks smooth, unlike prior art approaches which reduce computation by decreasing the frame rate.

This process is general enough to be used with any VLSI device which performs IDCT as part of its video data manipulation.

DETAILED DESCRIPTION OF THE PREFERRED EMBODIMENTS

1. Overall Description

In accordance with an aspect of the present invention, a process is presented to alleviate heavy computational demand on the processor adaptively, according to the current total load, due to two-dimensional inverse discrete cosine transform (2-D IDCT, or simply IDCT). This process gracefully degrades video output quality.

Figure 1:
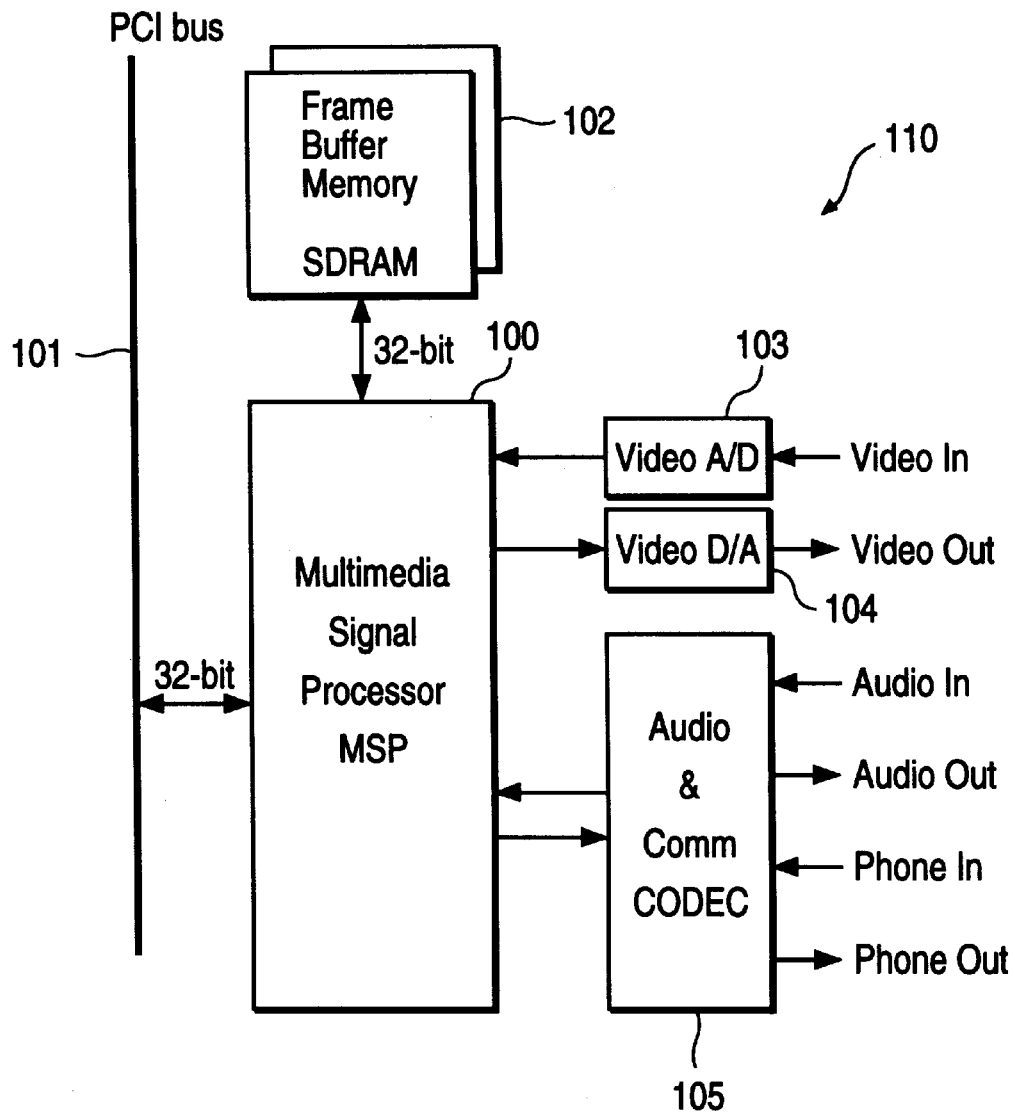
FIG. 1 illustrates a multimedia signal processor 100 (in a typical multimedia computer system configuration 110) as a coprocessor connected to audio and communication peripheral 105, video peripherals 103 and 104, external memory 102 and a PCI bus 101.

FIG. 1 shows a typical multimedia computer system configuration 110 with MSP 100 as a coprocessor connected to external memory 102, video converters 103 and 104, audio and communication peripheral 105, and a PCI bus 101. MSP coprocessor 100 communicates through PCI bus 101 with the main processor e.g., a Pentium processor, of the computer system, which is not shown. In another embodiment, the system configuration may be so that MSP 100 is the main and sole VLSI chip of a multimedia system.

Figure 3A:
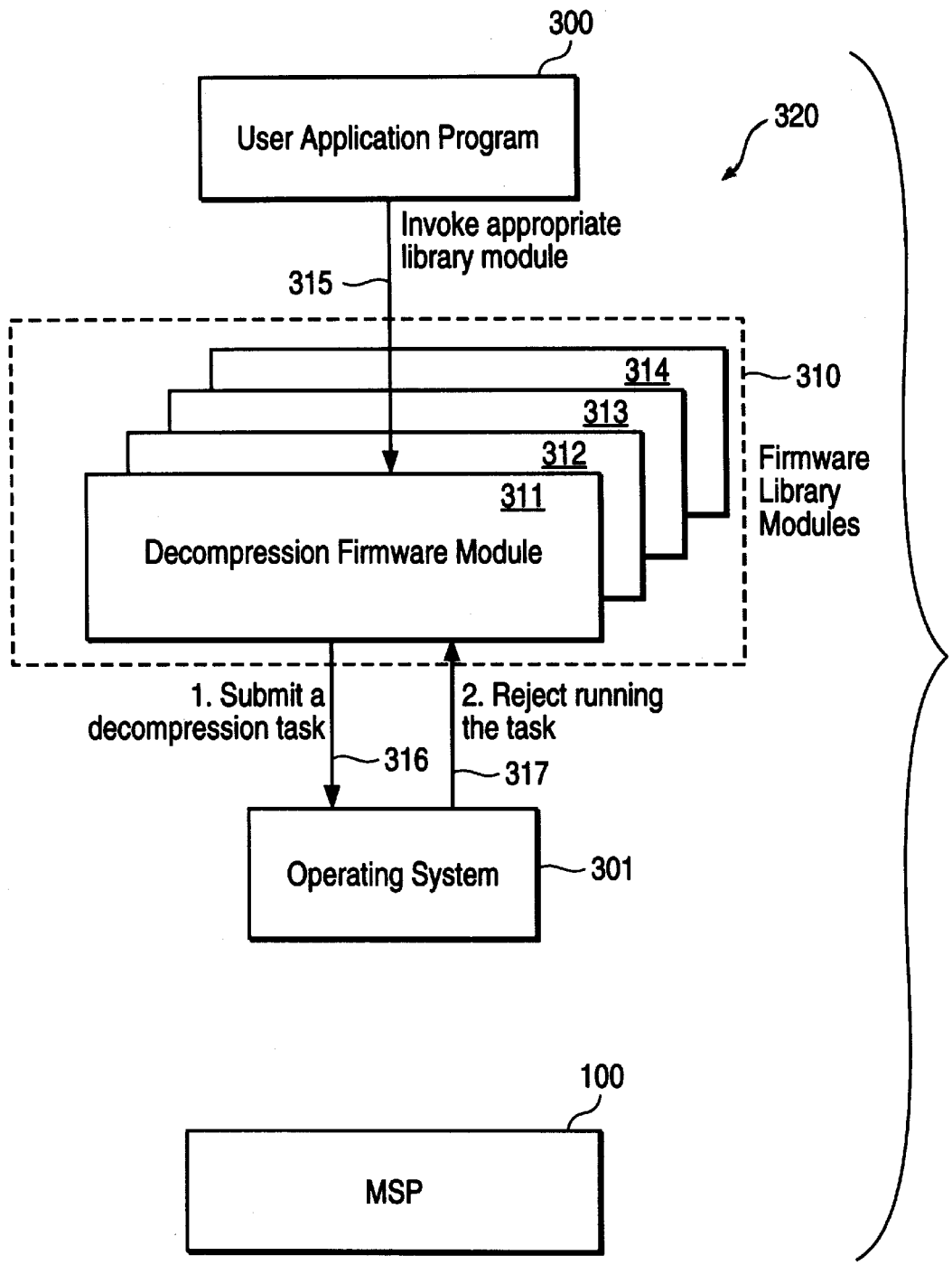
FIG. 3A shows a conceptual structure and control flows 320 of a prior art user application program 300 invoking a decompression task 315 and submitting it to the operating system 316 to be run on an MSP.

In one embodiment, which is shown in FIG. 3A, the present invention is incorporated into an MPEG firmware 311 as a part of library modules 310 (i.e., from module 311 to module 314) built into a ROM (read-only memory) on multimedia signal processor (MSP) integrated circuit chip 100, which runs a real-time multitasking operating system (OS) 301. The current invention adaptively reduces the computation requirement of performing the IDCT step in MPEG decompression, only if OS 301 determines there is a likelihood of overloading due to a decompression task which performs IDCT. As performing IDCT demands the most computation in a decompression task, reducing the amount of computation in performing IDCT directly translates into reducing computational demand of a decompression task.

Normally, in a conventional process 320, of FIG. 3A, when accepting an additional decompression task at step 316 (invoked by a user application program 300) may overload MSP 100, OS 301 rejects tasks at step 317 based on the expected total computational load.

Figure 2:
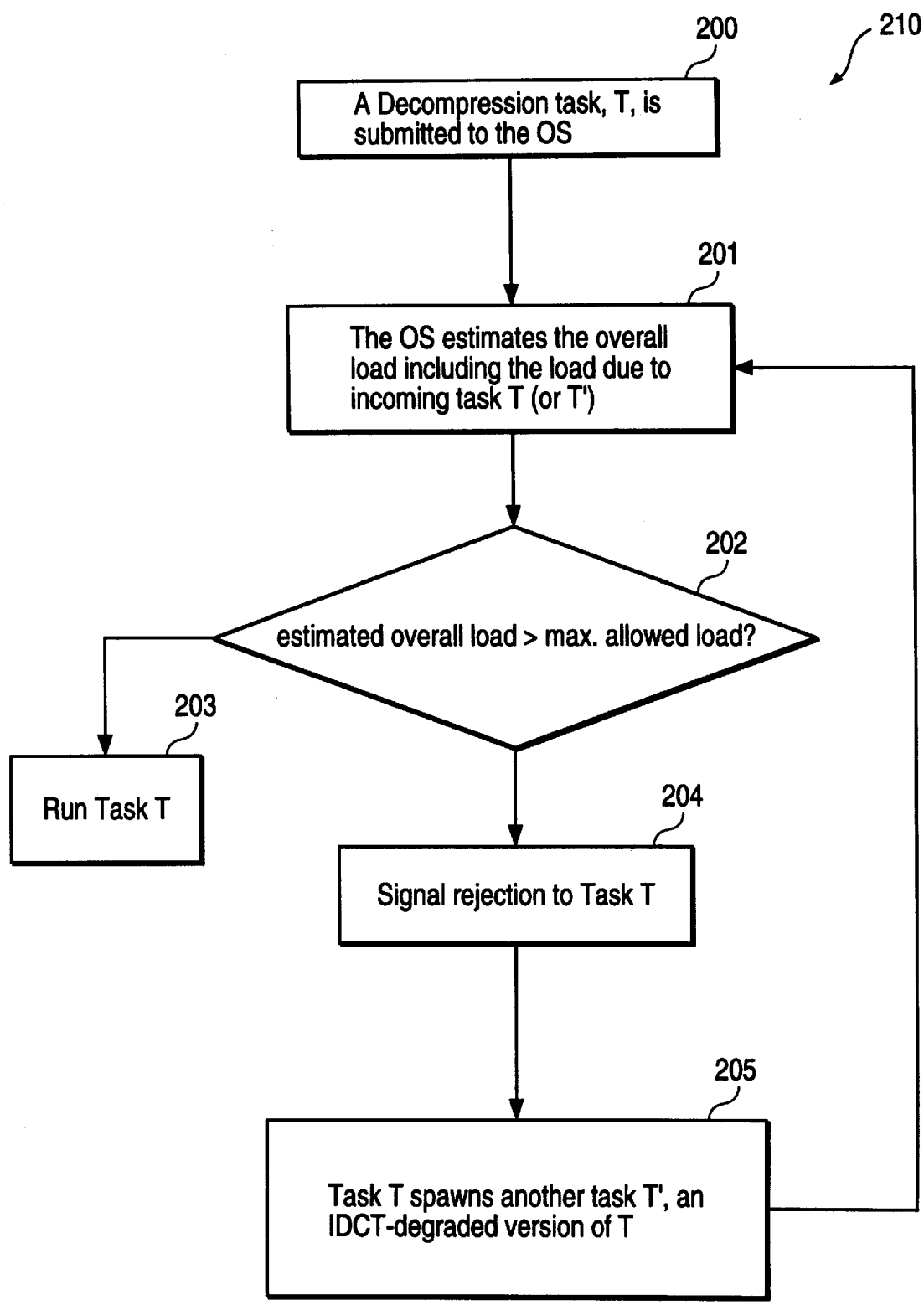
FIG. 2 shows a flowchart 210 which describes how an IDCT-degraded decompression task is spawned and resubmitted in accordance with the present invention.
Figure 3B:
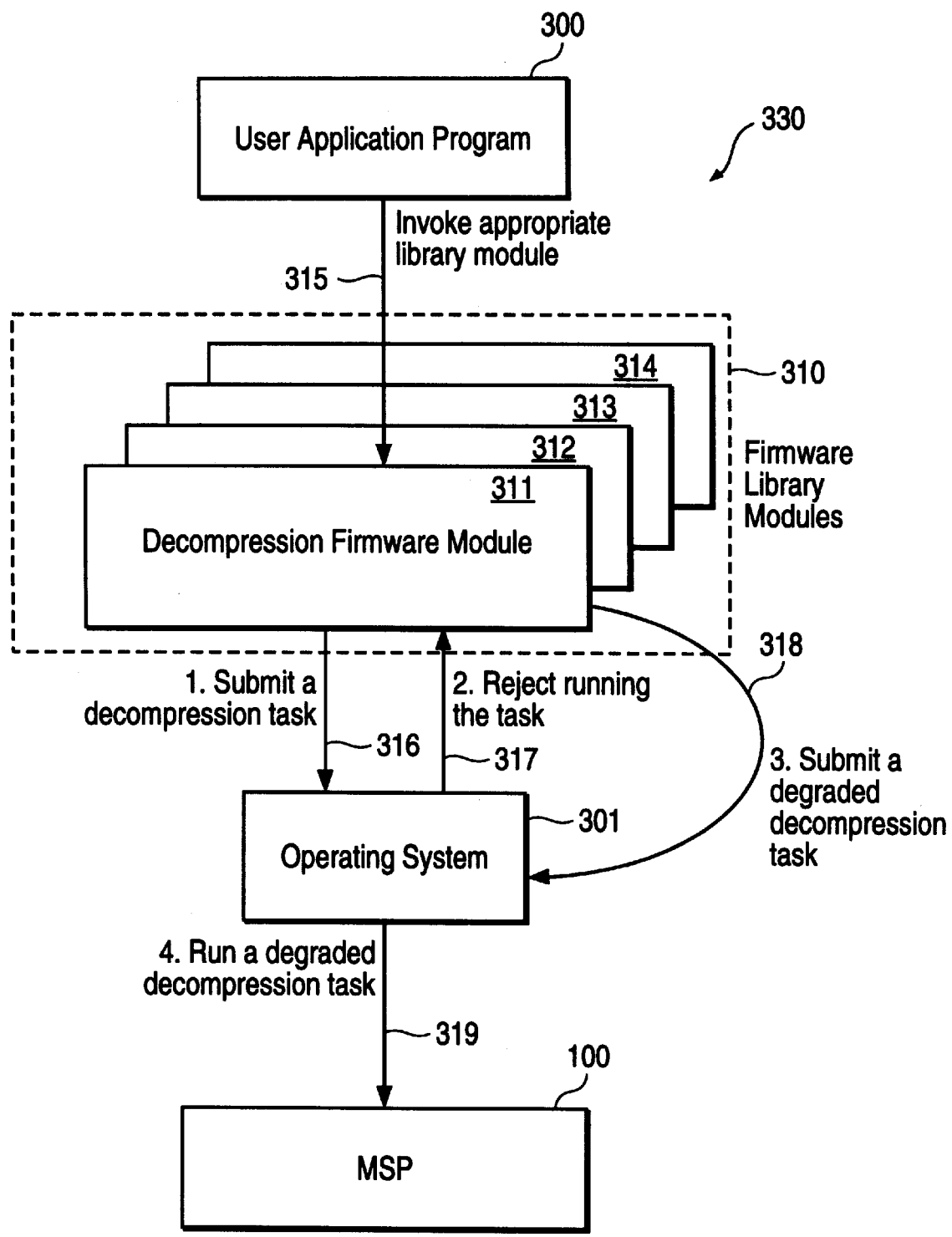
FIG. 3B shows a conceptual structure and controls of the present invention.

Under process 330, which is shown in FIG. 3B, if a decompression task that might overload MSP 100 is submitted at step 316 to OS 301 to be run on the MSP 100, OS 301 will reject running the task at step 317. However, OS 301 at step 317 notifies the rejected task of the rejection via a predetermined signal by, for example, setting a predetermined binary flag variable to 0. Noticing the rejection signal, the rejected task spawns an IDCT-degraded decompression task, which is subsequently submitted to OS 301 at step 318. As the IDCT degraded decompression task requires less computation, there exists a higher likelihood that the newly submitted task will be run at step 319 on MSP 100. A more detailed example of process 330 by which OS 301 determines whether to run an incoming decompression task, and the steps of submitting an IDCT-degraded decompression task to OS 301 are illustrated in the flowchart of FIG. 2.

Depending on the current load of MSP 100, OS 301 estimates the expected total load at step 201, taking into consideration the newly submitted task. The newly submitted task may be the one submitted at step 316 of FIG. 3B or the IDCT degraded task submitted at step 318 of FIG. 3B. Even the IDCT-degraded decompression task may be rejected, as it may still push the chip's overall computational load past the maximum allowable operational load. At this point, i.e. at step 202, when even the degraded task submission is also rejected, there are more than one way to deal with the second rejection. Firmware 311 may decide, from that point onwards, to submit only an IDCT-degraded decompression task in all subsequent decompression tasks. The computational load induced by IDCT under this scheme is reduced with certainty. Another method is to keep resubmitting an incrementally IDCT-degraded decompression task until the task's computational demand will not overload the MSP. Yet another method is to keep skipping video frames (displaying the most recently decompressed frame) until the overall load goes down and at least a decompression task IDCT-degraded by some fixed rate (%) can be performed without overloading the MSP. Yet another method is to custom-tailor the degradation level (%) according to the current overall load of the MSP by setting the number of zero rows, j, to a minimum integer value that will not overload the MSP. This fourth method has an advantage that the IDCT-degraded task is submitted only once, rather than many times, as in the second method. Many variations of the first, the second, the third and/or the fourth methods can be implemented within the scope of the invention.

One of the reduction rates found to be practical for the present invention is approximately 0.5. (The actual reduction rate set close to 0.5 depends on the number of rows of the matrices and the number of rows that are set to zero.) That is, the computational demand of the IDCT-degraded decompression task will be half of that of the undegraded version. For example, each undegraded decompression task can take up approximately 38% of an MSP's maximum computational capacity (100%). If two such decompression tasks are already being run on the MSP, the current load will be at 76%. Trying to run a third decompression task at this point will certainly exceed the maximum computational capacity (100%) of the MSP. To prevent the overloading, the OS rejects the third task. This rejection is signaled to the rejected task and another decompression task with half the computational demand of the original task is submitted. As adding 19% of load to existing 76% does not exceed 100%, the degraded task is allowed to run by the OS. Incorporating the new process, three tasks instead of two tasks can now be carried out simultaneously.

2. Description of the Gracefully Degrading IDCT

Nowadays, MSP chips have MPEG-1 and MPEG-2 decoding and/or encoding routines built in as library modules 310 (FIG. 3A) in their ROMs. Under either MPEG-1 or MPEG-2 standard, encoding is done on both interframe information and intraframe information. A macroblock within the interframe information is encoded in three formats: intra, predicted, or interpolated. Then the intraframe information is compressed in three steps: 2-D DCT, quantization and variable-length encoding. The present invention focuses on decoding.

Typically IDCT is performed by multiplying three n×n matrices, C, E and $C^t$, to compute $CEC^t$, where matrix $C^t$ is a transpose of kernel matrix C, and E is a DCT-transformed data matrix. In fact, the multiplication is carried out in a form, $C[CE^t]^t$, which is equivalent to $CEC^t$. The computation of $C[CE^t]^t$ is carried out by computing $CE^t$ and then $CX^t$ where X is the intermediate result $CE^t$, thus performing two matrix multiplications of form CZ, where matrix Z is $E^t$ in the first multiplication and $X^t$ in the second multiplication. The present invention reduces computation by replacing the elements of bottom j rows of matrix Z with zeros (0's), where j is an integer ranging from 1 to (n−1). The effect of twice "zeroing" the bottom is that the elements of the resulting matrix are all zeros except in its upper left corner region. As these "zeroed" elements of the Z matrix usually represent high frequency components of a video frame, which convey less visual information than the low frequency components, substituting zeroes for the elements of the several bottom rows and rightmost columns does not severely degrade the video output quality. Since the frame rate is not compromised, the motion still looks smooth, unlike prior art approaches which reduce computation by decreasing the frame rate.

As each 8×8 matrix multiplication requires 64 scalar multiplications and accumulation operations, performing two 8×8 matrix multiplications requires 128 scalar multiplications and 128 accumulations. The amount of computation can be reduced if elements of bottom j rows of matrix E are replaced with zeros, where j is an integer ranging from 1 to 7, or from 1 to (n−1) when the size of the matrices is generalized to n×n. It can be easily shown that, using the present invention, for n×n matrices, the computation is reduced by $2j(2n-j)$ multiplications and $2j(2n-j)$ accumulations. When n equals 8, if number of zero rows j equals 2

(i.e., if only two bottom rows are filled with zeros), 56 of the 128 multiplications and accumulations are eliminated, achieving computational savings of 44%; if j equals 3, 78 multiplications and accumulations are eliminated, a savings of 61%. Thus, by appropriately adjusting the number of bottom rows in a matrix to be set to zero, an IDCT subtask (as part of a decompression task) of a predetermined level of degradation can be achieved.

Although, in the above description, the present invention is described in the context of reducing computation involved in MPEG video data decompression, any task that involves IDCT will benefit from the process of the present invention.

The above detailed description is provided to illustrate the specific embodiment of the present invention and is not intended to be limiting. Many variations and modifications are possible within the scope of the present invention. The present invention is set forth in the following claims.

We claim:

1. A process built into an integrated circuit device for video signal processing, said device running a multitasking operating system (OS), said process comprising submitting a task which uses inverse discrete cosine transformation (IDCT) to said OS, said IDCT comprising two matrix multiplications, $CE^t$ and $CX^t$, where superscript t represents matrix transposition, a matrix C is a kernel matrix of a discrete cosine transform (DCT), matrix E is DCT-transformed information, and a matrix X equals $CE^t$, wherein each entry of j bottom rows of said matrices E and X is replaced with zero, said j being an integer ranging from 1 to (r−1), wherein r is the number of rows in said matrices E and X.

2. A process as in claim 1, wherein said process is video image decompression.

3. A process as in claim 1, wherein said process is used in a multi-tasking OS.

4. A process as in claim 3, wherein said multi-tasking operating system is a real-time OS.

5. A process as in claim 1, wherein said data matrix has eight rows and eight columns.

6. A process built into an integrated circuit device for video signal processing, said device running a multitasking operating system (OS), said process comprising submitting a task which uses inverse discrete cosine transformation (IDCT) to said OS, said IDCT comprising two multiplications, $CE^t$ and $CX^t$, where superscript t represents matrix transposition, C is a kernel matrix of the discrete cosine transform (DCT), matrix E is a DCT-transformed information, and matrix X equals $CE^t$, wherein said task and said OS interact in the following steps:

(a) said task is submitted to said OS to be carried out by said device;

(b) if running said task will not overload said device, said task is allowed to run on said device by said OS; if running said task will overload said device, said OS rejects running said task and signals the rejection;

(c) if said OS rejects running said task in (b), another task being same as said task except with the following difference is submitted to said OS to be run on said device:

each entry of bottom j rows of said matrices E and X of said another task being replaced with zero, said j being an integer ranging from 1 to (r−1), wherein r is an integer being the number of rows in said matrices E and X.

7. A process as in claim 6, wherein said task is video image decompression.

8. A process as in claim 6, wherein said data matrix has eight rows and eight columns.

9. A process as in claim 6, wherein said multitasking OS is a real-time OS.

10. A process as in claim 6, wherein said j is a minimum integer that will not overload said device.

11. A process comprising:

running a multitasking operating system on a device;

submitting a first task to the operating system for evaluation of whether the first task will overload the device, wherein the first task comprises:

determining a first matrix product $CE^t$, wherein C is a transformation matrix, $E^t$ is a transpose of a matrix E after elements in j rows of the matrix E are replaced with zeros, and j is a positive integer; and determining a second matrix product $CX^t$, wherein $X^t$ is a transpose of a matrix X, and the matrix X results from replacing elements in j rows of the first matrix product $CE^t$ with zeros; and selecting whether the device executes the first task, wherein the device executes the first task if the operating system determines that executing said task will not overload the device and the device does not execute the first task if the operating system determine that executing the first task will overload the device.

12. The process of claim 11, wherein the device performs video signal processing.

13. The process of claim 12, wherein the transform matrix C is a kernel matrix of a discrete cosine transform.

14. The process of claim 11, wherein in response the operating system determining that executing the first task will overload the device, the process further comprises:

submitting a second task to the operating system for evaluation, wherein the second task is identical to the first task except that j for the second task is greater than j for the first task; and selecting whether the device executes the second task, wherein the device executes the second task if the operating system determines that executing the second task will not overload the device and the device does not execute the second task if the operating system determine that executing the second task will overload the device.

15. The process of claim 14, wherein j for the second task is greater than j for the first task by one, and the process further comprises, if the second task overloads the device, submitting a new task by increasing j for the new task by one until the new task does not overload the device.

16. The process of claim 14, wherein j for the second task is selected so that the second task does not overload the device, and the process further comprises submitting subsequent new tasks with the same j as the second task.

17. The process of claim 14, wherein j for the second task is decided arbitrarily, and the process further comprises, if the second task overloads the device, skipping the second task and subsequent new tasks with the same j as the second task until a subsequent task does not overload the device.

* * * * *